(12) United States Patent
Ariyoshi

(10) Patent No.: US 6,745,625 B2
(45) Date of Patent: Jun. 8, 2004

(54) FLUID FLOW RATE MEASURING APPARATUS

(75) Inventor: Yuji Ariyoshi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/277,082

(22) Filed: Oct. 22, 2002

(65) Prior Publication Data

US 2003/0196487 A1 Oct. 23, 2003

(30) Foreign Application Priority Data

Apr. 22, 2002 (JP) .................................... 2002-118868

(51) Int. Cl.[7] ............................................. G01F 1/68
(52) U.S. Cl. .................................................. 73/204.26
(58) Field of Search ....................... 73/204.26, 204.18, 73/204.21, 204.19

(56) References Cited

U.S. PATENT DOCUMENTS

| 5,717,136 A | * | 2/1998 | Aoi et al. | ................. | 73/204.26 |
| 6,230,560 B1 | * | 5/2001 | Suzuki | ..................... | 73/204.25 |
| 6,314,807 B1 | * | 11/2001 | Kawai et al. | ............. | 73/204.26 |

FOREIGN PATENT DOCUMENTS

| EP | 0 943 900 A1 | 9/1999 |
| JP | 3-248018 | 11/1991 |

OTHER PUBLICATIONS

Lammerink, T.S.J., et al., "A New Class of Thermal Flow Sensors Using ΔT=0 as a Control Signal", IEEE, 2000, pp. 525–530.
U.S. patent application Ser. No. 10/082,191, Ariyoshi, filed Feb. 26, 2002.

* cited by examiner

*Primary Examiner*—Edward Lefkowitz
*Assistant Examiner*—Jewel V. Thompson
(74) *Attorney, Agent, or Firm*—Leydig, Voit & Mayer, Ltd.

(57) ABSTRACT

A fluid flow rate measuring apparatus for measuring a flow rate of fluid, including a first heating element which is disposed at an upstream side in a direction of flow of the fluid, a first temperature detecting element in the vicinity of the first heating element, a second heating element which is disposed at a downstream side in the direction of flow of the fluid, a second temperature detecting element in the vicinity of the second heating element and a power source which is connected to the first and second heating elements and supplies electric power to the first and second heating elements so as to make the temperature of the first temperature detecting element higher by a predetermined value than the temperature of the second temperature detecting element at all times. The flow rate of the fluid is measured from a ratio of a quantity of the electric power supplied to the first heating element to that supplied to the second heating element.

5 Claims, 13 Drawing Sheets

FLUID FLOW RATE MEASURING APPARATUS

BACKGROUND OF THE INVENTION

1. Field of the Invention

The present invention relates to a fluid flow rate measuring apparatus used at a location requiring measurement of a flow rate of fluid such as air, for example, at an engine control device in a motor vehicle or an air conditioning appliance.

2. Description of the Prior Art

FIG. 13 is a fragmentary sectional view of a conventional fluid flow rate measuring apparatus disclosed in Japanese Patent Laid-Open Publication No. 11-326003(1999). The conventional fluid flow rate measuring apparatus includes a silicon substrate 101, an air space 102 defined in the silicon substrate 101 by etching, thin film members, i.e., thin-wall portions 103 and 104 bridged over the air space 102, first and second heating elements 105 and 106 and first and second temperature detecting elements 107 and 108. The heating elements 105 and 106 and the temperature detecting elements 107 and 108 are made of a temperature sensitive resistance material whose resistance value varies according to temperature. For example, platinum is used as the temperature sensitive resistance material. The first and second heating elements 105 and 106 are manufactured so as to have substantially identical resistance values and temperature coefficients. The first and second temperature detecting elements 107 and 108 are also manufactured so as to have substantially identical resistance values and temperature coefficients.

In FIG. 13, the first heating element 105 and the first temperature detecting element 107 are spaced away from each other in order to facilitate understanding of their arrangements but are actually formed at substantially identical locations so as to be held in close contact with each other thermally. Likewise, the second heating element 106 and the second temperature detecting element 108 are spaced away from each other in order to facilitate understanding of their arrangements but are actually formed at substantially identical locations so as to be held in close contact with each other thermally.

FIG. 14 shows a circuit of the conventional fluid flow rate measuring apparatus of FIG. 13. The circuit includes fixed resistances 109 and 110 which form a bridge circuit 117 with the first and second temperature detecting elements 107 and 108, a comparator 111 for comparing intermediate potentials 118 and 119 of the bridge circuit 117, an inverter 112, electronic switches 113 and 114, a power source 115 and a fluid flow path 116. The conventional circuit is operated as follows. When a difference between the intermediate potentials 118 and 119 is produced in case there is no flow of fluid, the comparator 111 detects this difference between the intermediate potentials 118 and 119 so as to control the electronic switches 113 and 114. If the fixed resistances 109 and 110 are set to have an identical resistance value, the first and second temperature detecting elements 107 and 108 also have an identical resistance value and thus, have an identical temperature. In case there is no flow of the fluid, on-state periods of the electronic switches 113 and 114 become identical with each other and thus the ratio of electric power supplied to the first heating element 105 and to the second heating element 106 is 50%:50%.

Subsequently, a case in which the fluid is flowing is described. When the fluid flows in the direction of the arrow in FIG. 14, heat is transferred from the first heating element 105 and the first temperature detecting element 107 to the fluid, so that a temperature of the first temperature detecting element 107 drops. The fluid which absorbed heat from the first heating element 105 and the first temperature detecting element 107 at an upstream side transfers the heat to the second temperature detecting element 108 and thus, a temperature of the second temperature detecting element 108 rises. Therefore, the intermediate potential 118 becomes lower than the intermediate potential 119 and thus, an output of the comparator 111 is at high level. Accordingly, the electronic switch 113 is turned on and thus, electric current flows through the first heating element 105. As a result, the first heating element 105 is heated by Joule heat so as to raise the temperature of the first temperature detecting element 107. Since the first heating element 105 and the first temperature detecting element 107 are cooled by the fluid flow, an on-state period of the electronic switch 113, which should elapse before the intermediate potential 118 exceeds the intermediate potential 119, becomes longer than that of a case in which there is no flow of the fluid. At the time the intermediate potential 118 has risen so as to exceed the intermediate potential 119, the electronic switch 114 is turned on and thus, electric current flows through the second heating element 106. Therefore, the second heating element 106 is heated by Joule heat so as to raise the temperature of the second temperature detecting element 108 and thus, the intermediate potential 119 rises. Since the second heating element 106 and the second temperature detecting element 108 are warmed by the fluid flow, an on-state period of the electronic switch 114, which should elapse before the intermediate potential 119 exceeds the intermediate potential 118, becomes shorter than that of the case in which there is no flow of the fluid. At the time the intermediate potential 119 has exceeded the intermediate potential 118, the electronic switch 114 is turned off and the electronic switch 113 is turned on, so that electric current flows through the first heating element 105 again.

By repeating the above mentioned operations, the intermediate potentials 118 and 119 ire held equally again. Therefore, even if there is a flow of the fluid, the temperatures of the first and second temperature detecting elements 107 and 108 are controlled equally. At this time, quantity of electric power supplied to the first heating element 105 becomes larger than that supplied to the second heating element 106. For example the ratio of the quantity of electric power supplied to the first heating element 105 and to the second heating element 106 is 60%:40%.

FIG. 15 shows an output waveform in the above mentioned operations of the conventional fluid flow rate measuring apparatus of FIG. 13. An output voltage Vout in FIG. 14 has a pulse waveform shown in FIG. 15. As a flow rate of the fluid rises further, quantity of electric power supplied to the first heating element 105 is increased more. Hence, in FIG. 15, an interval t1 increases and an interval t2 decreases. Therefore, if a difference d of duty ratios is measured by using the following equation (1), an output dependent on the flow rate can be obtained.

$$d=(t1-t2)/(t1+t2) \qquad (1)$$

FIG. 16 having an ordinate representing output and an abscissa representing flow rate shows such output characteristics. Furthermore, the difference d of duty ratios in the equation (1) can be expressed as follows by using a heat release value P1 of the first heating element 105 and a heat release value P2 of the second heating element 106.

$$(t1-t2)/(t1+t2)=(P1-P2)/(P1+P2) \qquad (2)$$

In this technique, if a back flow occurs, the interval t1 decreases and the interval t2 increases, so that the output is inverted and thus, it is possible to detect the back flow.

FIG. 17 shows dependency of temperature distribution on flow rate in the conventional fluid flow rate measuring apparatus of FIG. 13. In FIG. 17, flow rates v1, v2 and v3 have the relation of (0<v1<v2<v3). Temperature drop of the first temperature detecting element 107 caused by increase of the flow rate is larger than temperature rise of the second temperature detecting element 108. Therefore, if the temperatures of the first and second temperature detecting elements 107 and 108 are controlled equally, absolute values of the temperatures of the first and second temperature detecting elements 107 and 108 will decrease upon increase of the flow rate. Then, the temperatures of the first and second temperature detecting elements 107 and 108 come closest to a temperature of the fluid. When the temperatures of the first and second temperature detecting elements 107 and 108 have become substantially identical with the temperature of the fluid, heat supplied from the first and second heating elements 105 and 106 does not affect the temperatures of the first and second temperature detecting elements 107 and 108, so that it becomes impossible to detect the flow rate of the fluid. Supposing that this flow rate is referred to as a "saturated flow rate", a measurable upper limit of the flow rate in the conventional fluid flow rate measuring apparatus is the saturated flow rate.

FIG. 18 shows relation between temperature changes of the first and second temperature detecting elements 107 and 108 and flow rate in the conventional fluid flow rate measuring apparatus of FIG. 13. In FIG. 18, lines 121 and 122 indicate temperatures of the first and second temperature detecting elements 107 and 108, respectively in the case where the flow rate of the fluid is increased without changing duty ratios of power supply to the first and second heating elements 105 and 106, which duty ratios are obtained when the flow rate is zero. As indicated by the line 121, the temperature of the first temperature detecting element 107 drops upon increase of the flow rate. Meanwhile, as indicated by the line 122, the temperature of the second temperature detecting element 108 rises by absorbing heat from the upstream side in a region of small flow rate but drops from a point. If the first and second temperature detecting elements 107 and 108 which have such dependency on flow rate are subjected to isothermal control, the temperature of the first temperature detecting element 107 rises and the temperature of the second temperature detecting element 108 drops, so that the temperatures of the first and second temperature detecting elements 107 and 108 are converged to a temperature indicated by a line 123. Temperature drop for lowering the temperature of the second temperature detecting element 108 from the line 122 to the line 123 increases in the region of small flow rate as indicated by a sequence of the arrows A and B but decreases in a region of middle flow rate or more as indicated by a sequence of the arrows B, C and D. Hence, since change of a heat dissipation value of the second heating element 106 decreases, change of the difference d of duty ratios in the equation (1) also decreases. Therefore, the conventional fluid flow rate measuring apparatus has such a disadvantage that sensitivity drops also before the flow rate reaches the saturated flow rate.

SUMMARY OF THE INVENTION

Accordingly, an essential object of the present invention is to provide, with a view to eliminating the above mentioned drawbacks of prior art, a fluid flow rate measuring apparatus which has high sensitivity over a whole measurable flow rate region.

In order to accomplish this object of the present invention, a fluid flow rate measuring apparatus for measuring a flow rate of fluid, according to the present invention includes first and second heating elements which are disposed at upstream and downstream sides in a direction of flow of the fluid, respectively. First and second temperature detecting element are formed in the vicinity of the first and second heating elements, respectively. A power source is connected to the first and second heating elements and supplies electric power to the first and second heating elements so as to make a temperature of the first temperature detecting element higher by a predetermined value than that of the second temperature detecting element at all times such that the flow rate of the fluid is measured from a ratio of a quantity of the electric power supplied to the first heating element to that supplied to the second heating element.

BRIEF DESCRIPTION OF THE DRAWINGS

This object and features of the present invention will become apparent from the following description taken in conjunction with the preferred embodiments thereof with reference to the accompanying drawings in which.

Before the description of the present invention proceeds, it is to be noted that like parts are designated by like reference numerals throughout several views of the accompanying drawings.

DETAILED DESCRIPTION OF THE INVENTION

Hereinafter, embodiments of the present invention are described with reference to the drawings.

(First Embodiment)

Figure 1:
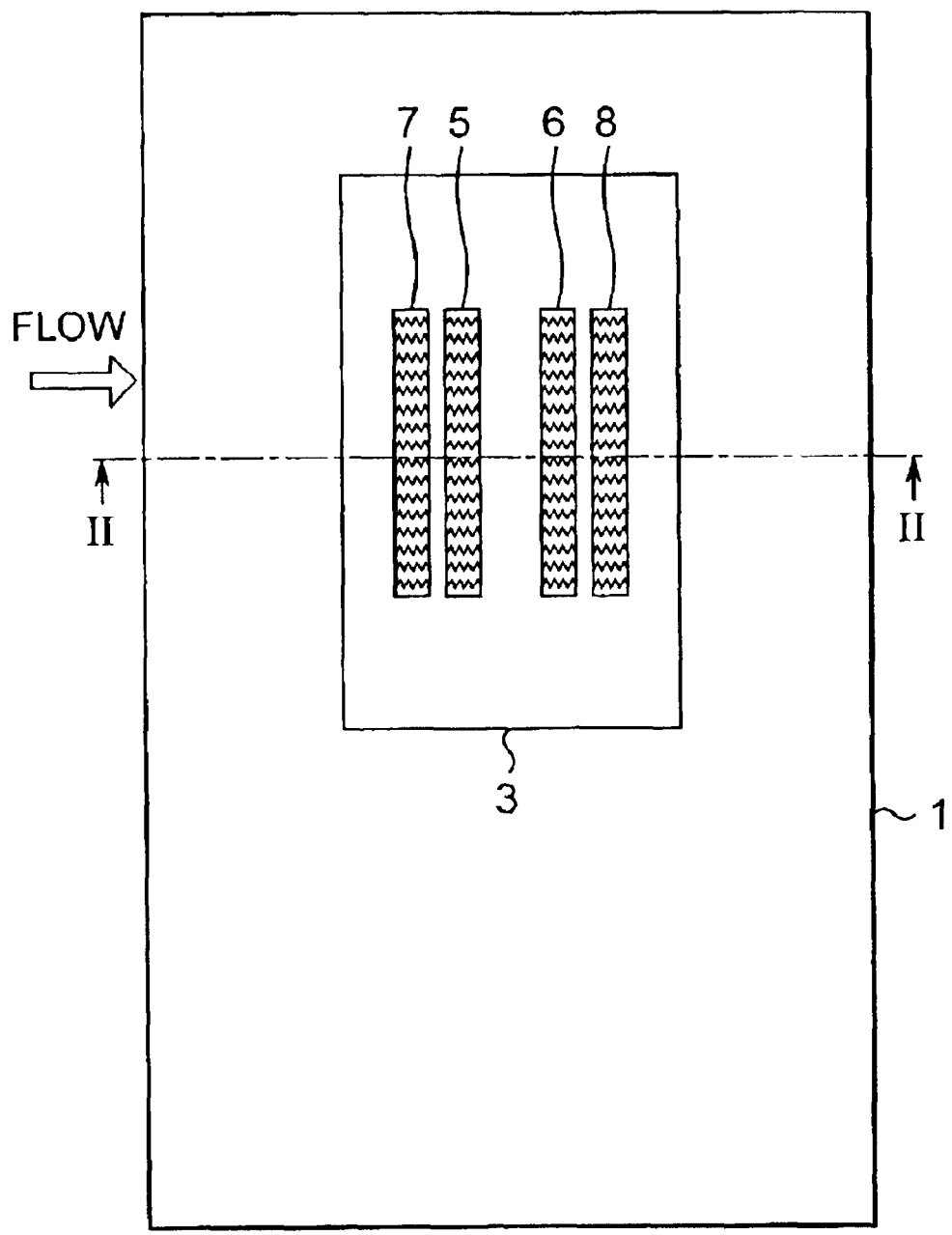
FIG. 1 is a top plan view of a fluid flow rate measuring apparatus according to a first embodiment of the present invention.
Figure 2:
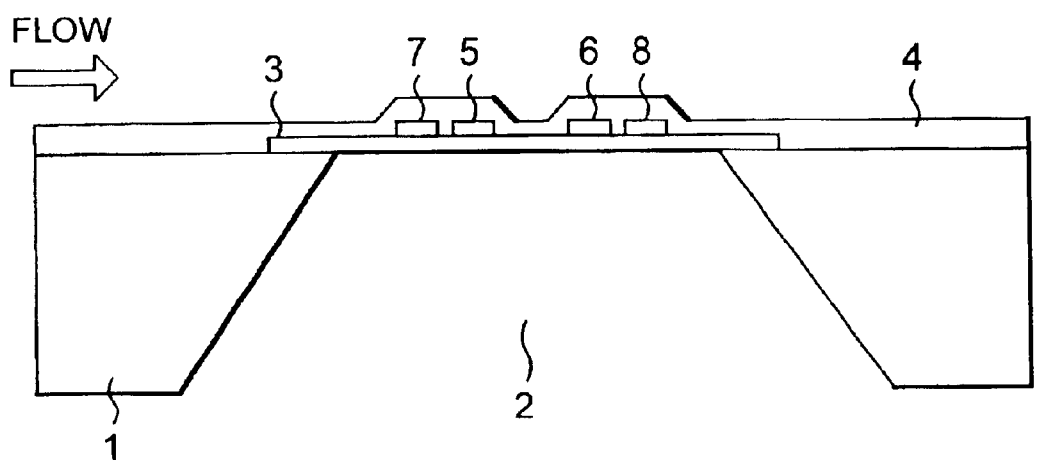
FIG. 2 is a sectional view taken along the line II—II in FIG. 1.

FIGS. 1 and 2 show a fluid flow rate measuring apparatus according to a first embodiment of the present invention. The fluid flow rate measuring apparatus includes an insulating layer 3 provided on a surface of a silicon substrate 1. The fluid flow rate measuring apparatus further includes a first heating element 5, a second heating element 6, a first temperature detecting element 7 and a second temperature detecting element 8, which are provided on the insulating layer 3. The first temperature detecting element 7 may be disposed at the substantially same position as or in the vicinity of the first heating element 5. Similarly, the second temperature detecting element 8 may be disposed at the substantially same position as or in the vicinity of the second heating element 6. The first and second heating elements 5 and 6 and the first and second temperature detecting elements 7 and 8 are made of a temperature sensitive resistance material, for example, platinum. The first and second heating elements 5 and 6 have substantially identical resistance values and temperature coefficients. The first and second temperature detecting elements 7 and 8 also have substantially identical resistance values and temperature coefficients.

Moreover, as shown in FIG. 2, the fluid flow rate measuring apparatus includes an insulating film 4 for protecting the first and second heating elements 5 and 6 and the first and second temperature detecting elements 7 and 8. A hollow 2 is provided on one face of the silicon substrate 1 remote from the first and second heating elements 5 and 6 and the first and second temperature detecting elements 7 and 8. By employing such a construction in the fluid flow rate measuring apparatus, thermal capacity of a flow rate measuring portion can be made quite small.

Figure 3:
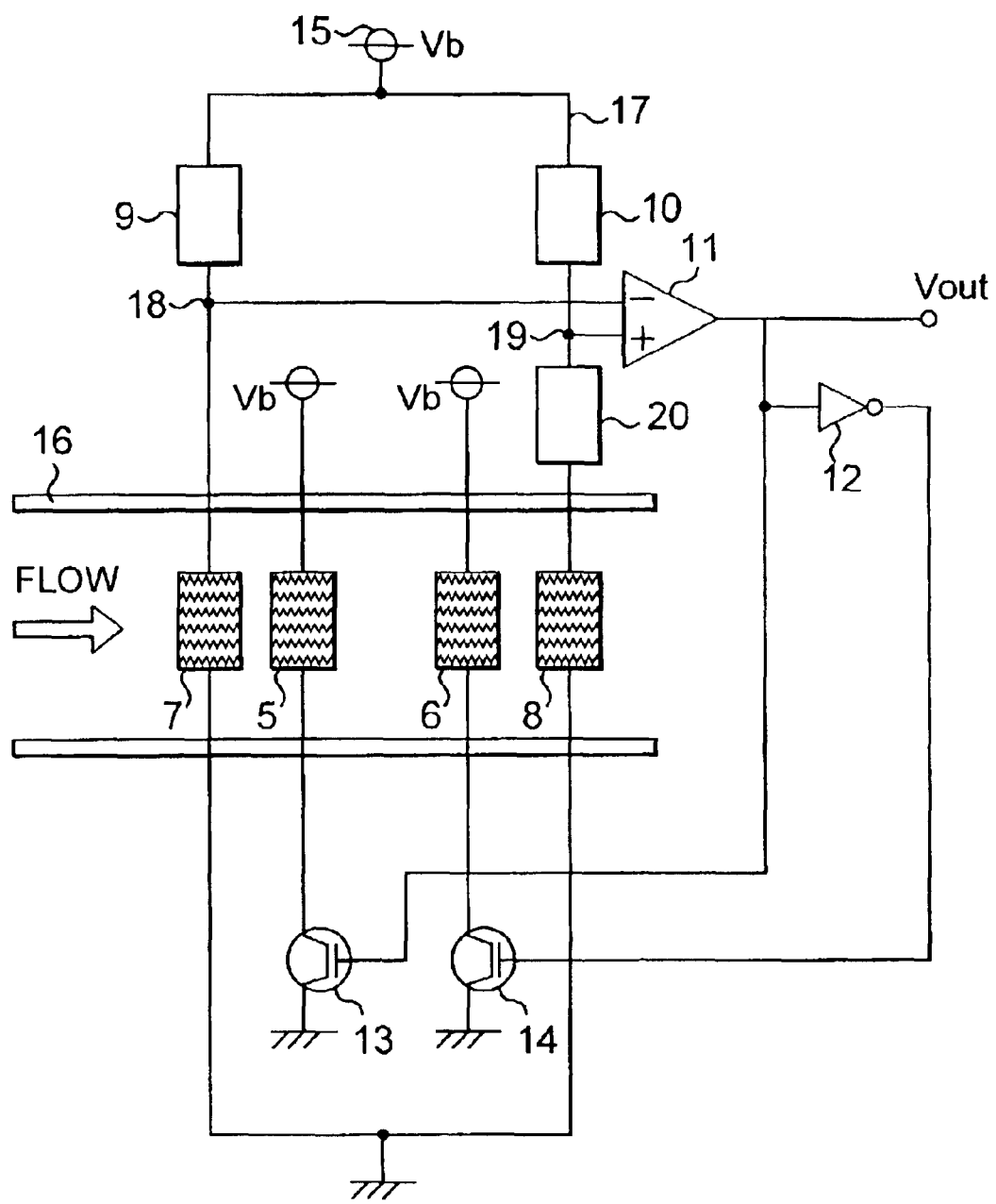
FIG. 3 is a circuit diagram of the fluid flow rate measuring apparatus of FIG. 1.

FIG. 3 is a circuit diagram of the fluid flow rate measuring apparatus of FIG. 1. The circuit includes fixed resistances 9 and 10 which form a bridge circuit 17 with the first and second temperature detecting elements 7 and 8, a comparator 11 for comparing intermediate voltages 18 and 19 of the bridge circuit 17, an inverter 12, electronic switches 13 and 14, a power source 15 and a fluid flow path 16. A fixed resistance 20 is connected in series between the second temperature detecting element 8 and the fixed resistance 10. The intermediate potential 19 is a potential between the fixed resistances 10 and 20. The fixed resistances 9 and 10 have an identical resistance value.

Then, operation of the fluid flow rate measuring apparatus of the above described configuration is described. In the circuit of FIG. 3, when the fluid flow rate measuring apparatus is not operating in case there is no flow of the fluid, the first and second temperature detecting elements 7 and 8 have substantially identical temperatures. At the time of start of operation of the fluid flow rate measuring apparatus, the first and second temperature detecting elements 7 and 8 have the identical temperatures and thus, substantially identical resistance values, while the intermediate potential 18 becomes lower than the intermediate potential 19 due to the fixed resistance 20. Therefore, an output of the comparator 11 is at high level, so that the electronic switch 13 is turned on and thus, electric current flows through the first heating element 5. Accordingly, the first heating element 5 is heated by Joule heat so as to raise a temperature of the first temperature detecting element 7 and thus, the intermediate potential 18 rises. If the intermediate potential 18 exceeds the intermediate potential 19, the output of the comparator 11 is at low level, so that an output of the inverter 12 is at high level and thus, the electronic switch 14 is turned on. As a result, since electric current flows through the second heating element 6, a temperature of the second temperature detecting element 8 is raised by Joule heat of the second heating element 6 and thus, the intermediate potential 19 is raised. If the intermediate potential 19 exceeds the intermediate potential 18, the output of the comparator 11 is at high level, so that the first heating element 5 is heated. By repeating these operations, control is performed such that the intermediate potentials 18 and 19 become identical with each other. When the intermediate potentials 18 and 19 are identical with each other, a resistance value R7 of the first temperature detecting element 7 is given by the following equation:

$$R7 = R8 \times R9/R10 + R20 \times R9/R10$$

where R8 is a resistance value of the second temperature detecting element 8 and R9, R10 and R20 are resistance values of the fixed resistances 9, 10 and 20, respectively. From the relation of (R9=R10), the following equation (3) is obtained.

$$R7 = R8 + R20 \tag{3}$$

As will be seen from the equation (3), the resistance value R7 of the first temperature detecting element 7 is larger than the resistance value R8 of the second temperature detecting element 8 by the resistance value R20 of the fixed resistance 20. Namely, the temperature of the first temperature detecting element 7 is kept higher than the temperature of the second temperature detecting element 8 by a predetermined temperature. This predetermined temperature difference can be adjusted by the resistance value R20 of the fixed resistance 20.

Figure 4:
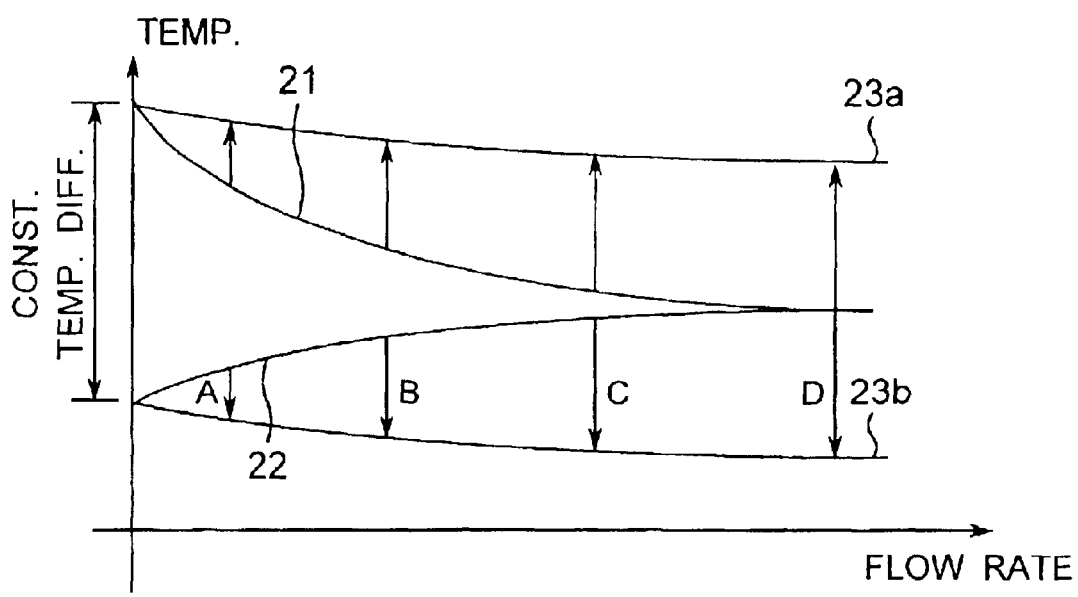
FIG. 4 is a graph showing dependency of temperature distribution of the fluid flow rate measuring apparatus of FIG. 1 on flow rate.
Figure 5:
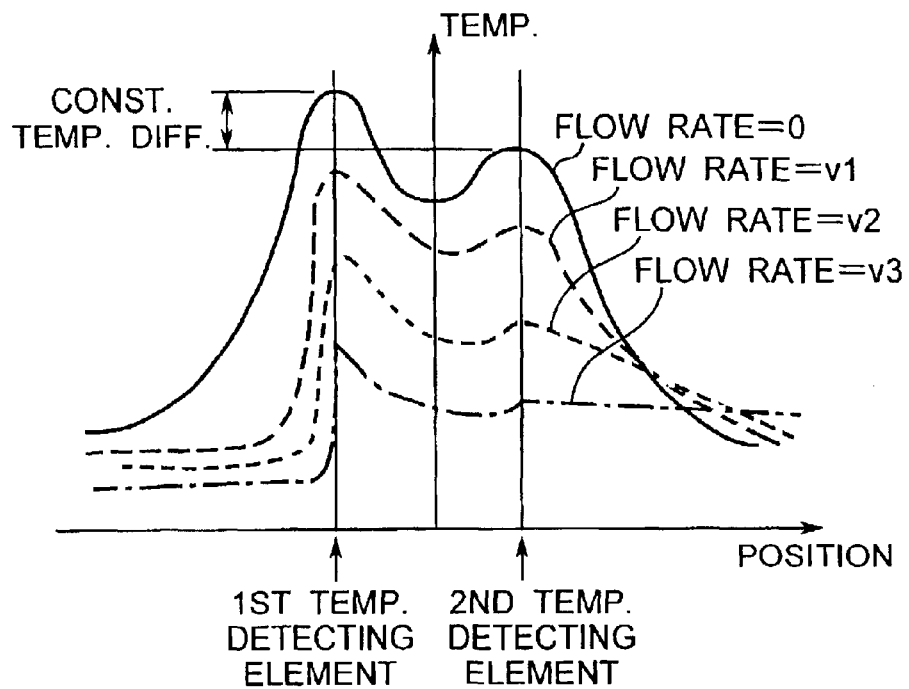
FIG. 5 is a graph showing temperature distribution of the fluid flow rate measuring apparatus of FIG. 1.

Subsequently, operating characteristics of the fluid flow rate measuring apparatus of this embodiment are described. FIG. 4 having an ordinate axis representing temperature and an abscissa axis representing flow rate shows dependency of temperature distribution of the fluid flow rate measuring apparatus of this embodiment on flow rate and its control operation. FIG. 5 having an ordinate axis representing temperature and an abscissa axis representing position of the fluid flow rate measuring apparatus of this embodiment along the direction of flow of the fluid shows temperature distribution of the fluid flow rate measuring apparatus, while FIG. 6 having an ordinate axis representing output and an abscissa axis representing flow rate shows output characteristics of the fluid flow rate measuring apparatus of this embodiment.

In case there is no flow of the fluid, the temperature of the first temperature detecting element 7 obtained at the time the temperature of the first temperature detecting element 7 is held higher than that of the second temperature detecting element 8 is higher than that of the first temperature detecting element 7 obtained at the time the temperatures of the first and second temperature detecting elements 7 and 8 are held identical with each other. Hence, if the fluid flows in the direction of the arrow in FIG. 3 in a state where the temperature of the first temperature detecting element 7 is held higher than that of the second temperature detecting element 8, more heat is transferred from an upstream side to a downstream side in the direction of flow of the fluid than the case where the temperatures of the first and second temperature detecting elements 7 and 8 are held identical with each other. Therefore, as shown in FIG. 4, the temperature of the second temperature detecting element 8 of the downstream side continues rising to a larger flow rate than the case where the first and second temperature detecting elements 7 and 8 are held identical with each other. In FIG. 4, lines 21 and 22 indicate dependency of the temperatures of the first and second temperature detecting elements 7 and 8 on flow rate, respectively obtained in the case where electric power is supplied to the first and second heating elements 5 and 6 at a duty ratio for maintaining a difference between the temperatures of the first and second temperature detecting elements 7 and 8 at the time the flow rate is zero.

If constant temperature difference control is carried out in this state, the temperature of the first temperature detecting element 7 rises to a line 23a and the temperature of the second temperature detecting element 8 drops to a line 23b until a temperature difference of the first and second temperature detecting elements 7 and 8 reaches a preset value. Even if the flow rate increases, this temperature difference is maintained. However, since heat is absorbed by the fluid flow as the flow rate increases, temperature distribution of the fluid flow rate measuring apparatus depends on the flow rate as shown in FIG. 5. In FIG. 5, flow rates v1, v2 and v3 have the relation of (0<v1<v2<v3). As the flow rate increases, the temperatures of the first and second temperature detecting elements 7 and 8 drop. Thus, as the flow rate increases, the temperature of the second temperature detecting element 8 comes closest to that of the fluid. Meanwhile, if the flow rate reaches a predetermined value or more, quantity of heat absorbed from the first temperature detecting element 7 exceeds that supplied by the first heating element 5 and thus, the temperature difference of the first and second temperature detecting elements 7 and 8 cannot be maintained. It is impossible to measure the flow rate at not less than a flow rate at which the temperature difference of the first and second temperature detecting elements 7 and 8 cannot be maintained. Supposing that this flow rate is referred to as a "saturated flow rate", a measurable upper limit of the fluid flow rate measuring apparatus is the saturated flow rate.

Figure 15:
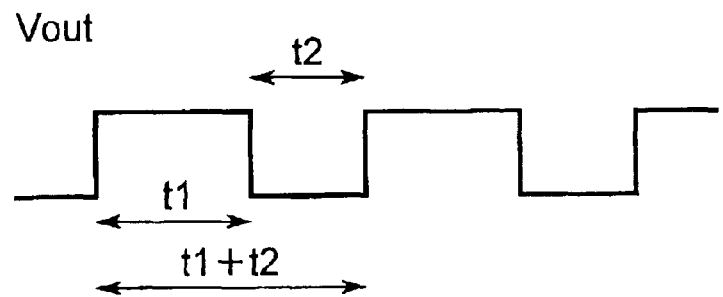
FIG. 15 is a view showing an output waveform of the prior art fluid flow rate measuring apparatus of FIG. 13.
Figure 16:
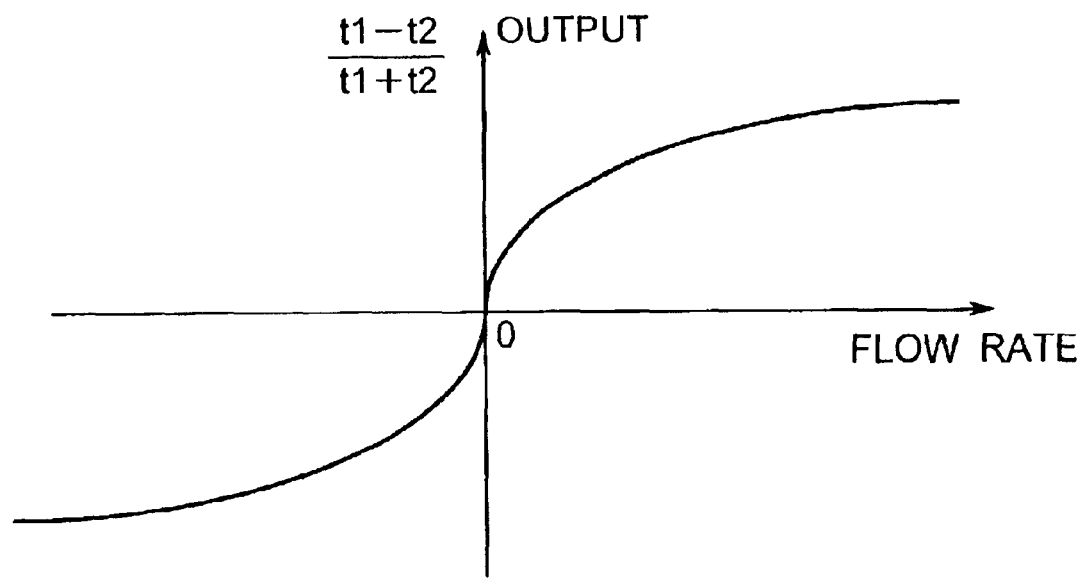
FIG. 16 is a graph showing output characteristics of the prior art fluid flow rate measuring apparatus of FIG. 13.
Figure 17:
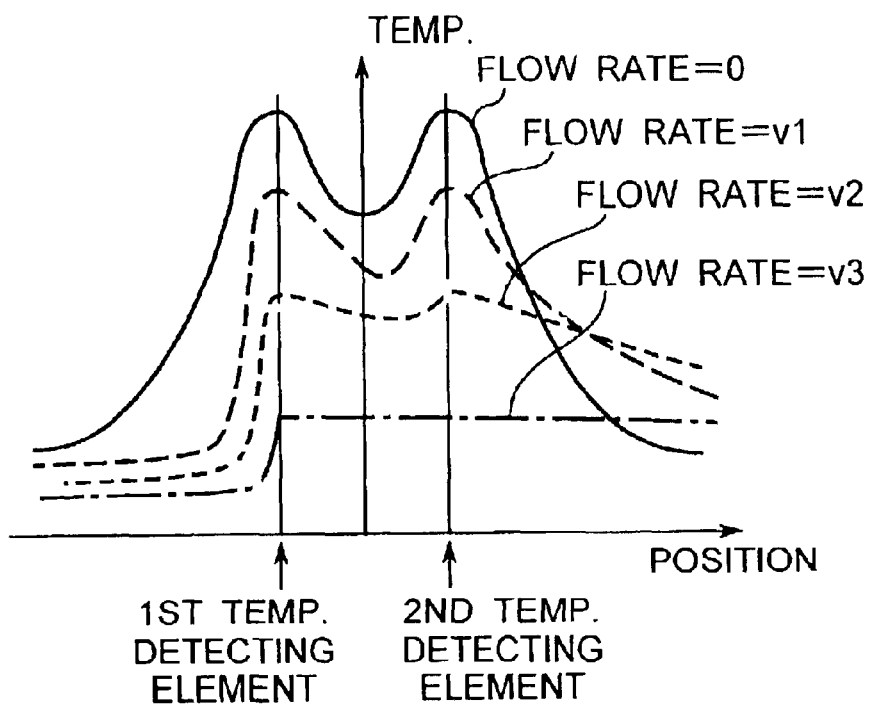
FIG. 17 is a graph showing dependency of temperature distribution of the prior art fluid flow rate measuring apparatus of FIG. 13 on flow rate.
Figure 18:
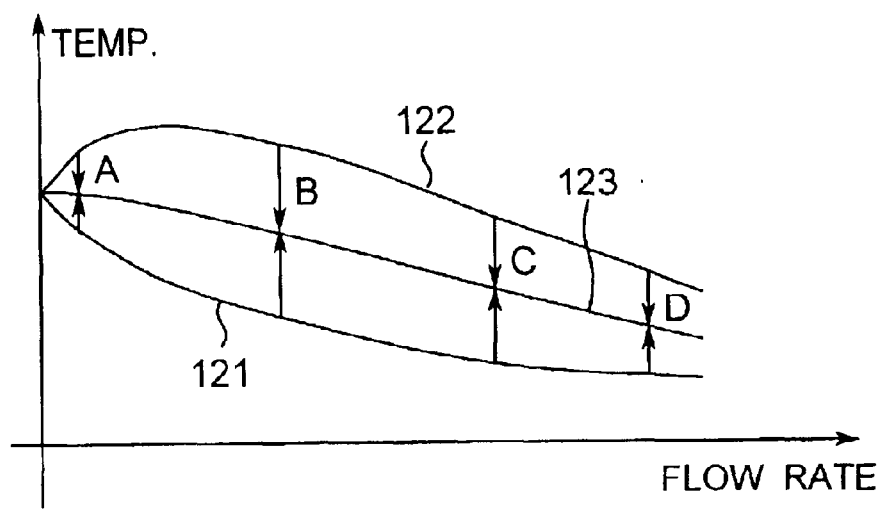
FIG. 18 is a graph showing dependency of temperatures of temperature detecting elements of the prior art fluid flow rate measuring apparatus of FIG. 13 on flow rate and their control.

As shown in FIG. 4, drop of the temperature of the second temperature detecting element 8 continues increasing upon increase of the flow rate as indicated by a sequence of the arrows A, B, C and D. Supposing that the fluid flow rate measuring apparatus has output characteristics having intervals t1 and t2 as shown in FIG. 15, a difference d of duty ratios is expressed by the following equation (4) identical with an equation (1) referred to earlier.

$$d=(t1-t2)/(t1+t2) \quad (4)$$

Figure 6:
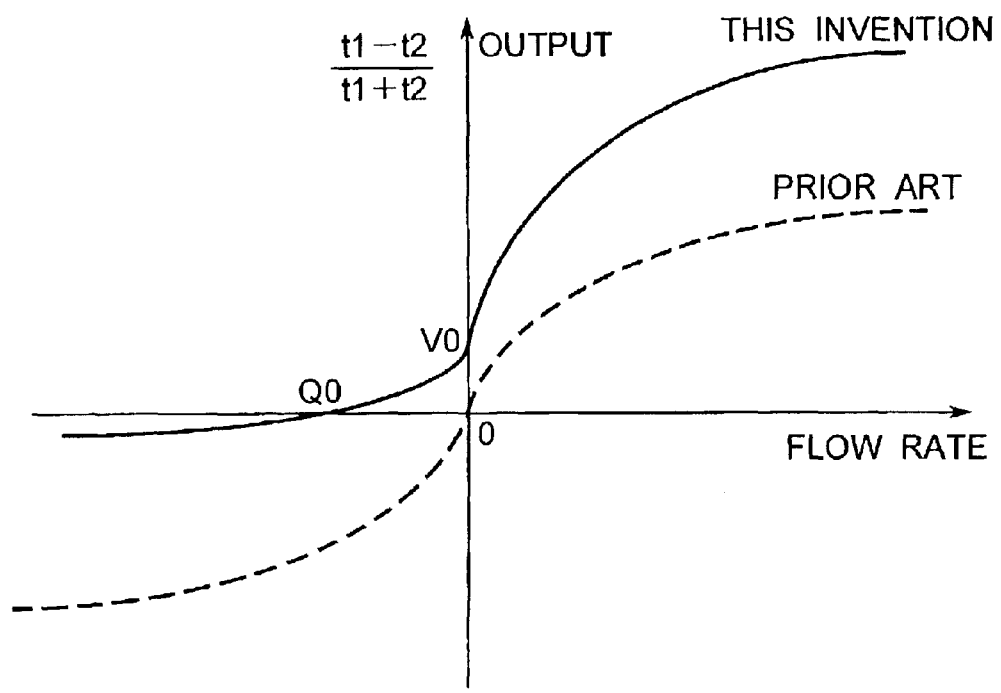
FIG. 6 is a graph showing output characteristics of the fluid flow rate measuring apparatus of FIG. 1.

Since heat dissipation value of the second heating element 6 also changes greatly upon increase of the flow rate, the difference d of the duty ratios expressed by the equation (4) also changes greatly. As a result, as shown in FIG. 6, sensitivity of the flow rate in the fluid flow rate measuring apparatus is improved over a whole measurable flow rate region in comparison with prior art. Especially, in case the temperatures of the first and second temperature detecting elements 7 and 8 are held identical with each other, the effect is conspicuous at a large flow rate in which amount of change of the temperature of the second temperature detecting element 8 decreases.

Figure 7:
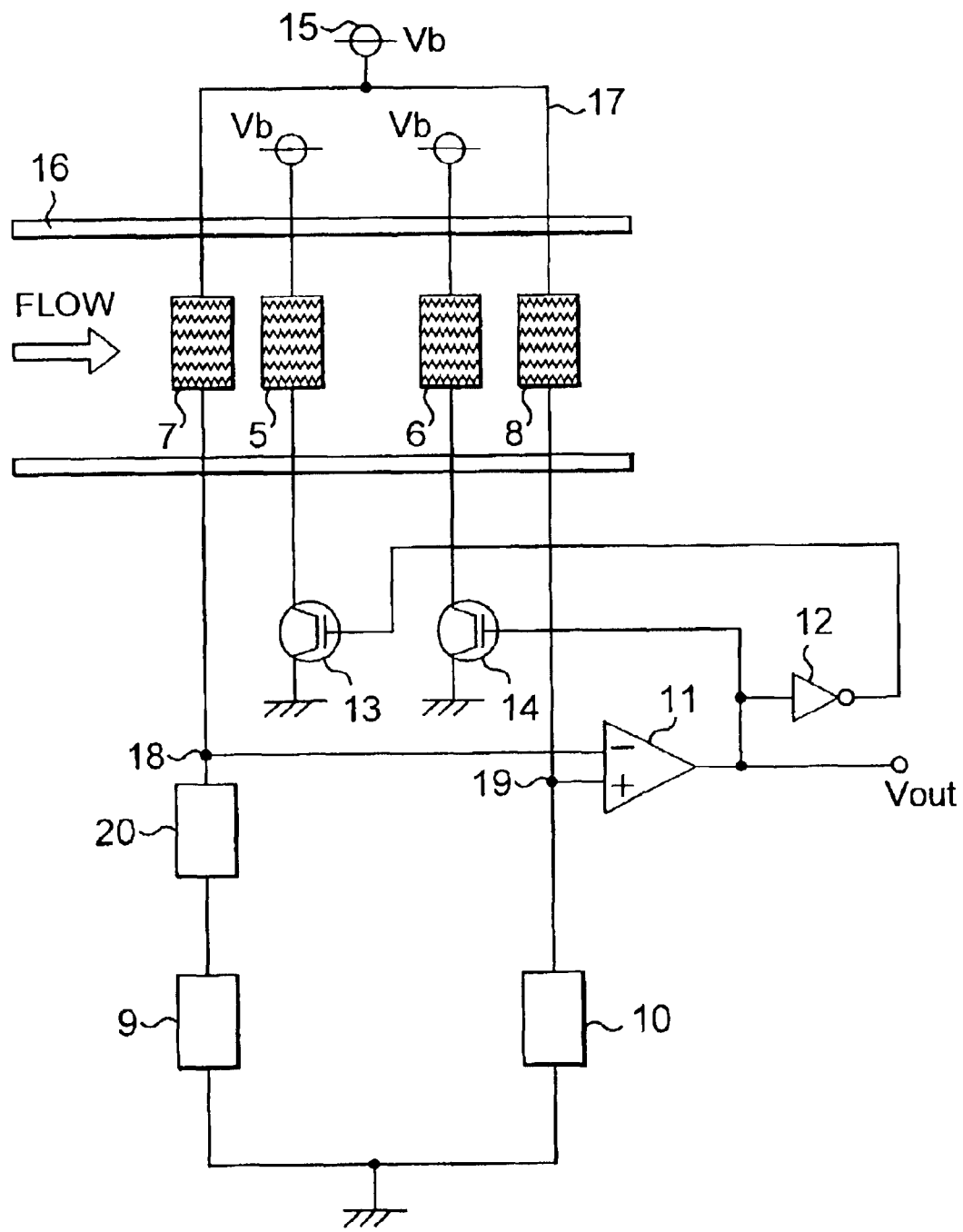
FIG. 7 is a view similar to FIG. 3, particularly showing a modification of the fluid flow rate measuring apparatus of FIG. 1.

FIG. 7 is a circuit diagram of a fluid flow rate measuring apparatus which is a modification of the fluid flow rate measuring apparatus of FIG. 1. In FIG. 7, although the first and second temperature detecting elements 7 and 8 are disposed at an upper portion of the bridge circuit 17 and the fixed resistance 20 is connected in series between the fixed resistance 9 and the intermediate potential 18, the fluid flow rate measuring apparatus functions in the same manner as that of FIG. 1. The fixed resistances 9 and 10 have the identical resistance value as described before. Therefore, supposing that the fixed resistances 9 and 20 which are connected to the first temperature detecting element 7 in series form a first fixed resistance portion and the fixed resistance 10 which is connected to the second temperature detecting element 8 in series forms a second fixed resistance portion, the first fixed resistance portion has a resistance value larger than that of the second fixed resistance portion. Since other configurations of the fluid flow rate measuring apparatus are similar to those of the fluid flow rate measuring apparatus of FIG. 1, the description is abbreviated for the sake of brevity.

Meanwhile, if the relation of the equation (3) is obtained and the temperature of the first temperature detecting element 7 is held higher than that of the second temperature detecting element 8 in a circuit configuration, the similar effects can be gained in the circuit configuration even if the circuit configuration is different from those of FIGS. 3 and 7.

In this embodiment, since the temperature of the first temperature detecting element 7 is held higher than that of the second temperature detecting element 8, sensitivity of the flow rate in the fluid flow rate measuring apparatus is improved over a whole measurable flow rate region, especially, at a large flow rate in comparison with a case where the temperatures of the first and second temperature detecting elements 7 and 8 are held identical with each other.

Meanwhile, in this embodiment, in order to hold the temperature of the first temperature detecting element 7 higher than that of the second temperature detecting element 8 also in case there is no flow of the fluid, larger quantity of electric power is supplied to the first heating element 5 than the second heating element 6 when the flow rate is zero. Therefore, as shown in FIG. 6, when the flow rate is zero, a bias voltage V0 is generated. As a result, since the need for a bias circuit which has been required to be provided in prior art is eliminated, such effects as reduction of a circuit scale and drop of the production cost can also be achieved.

Figure 8:
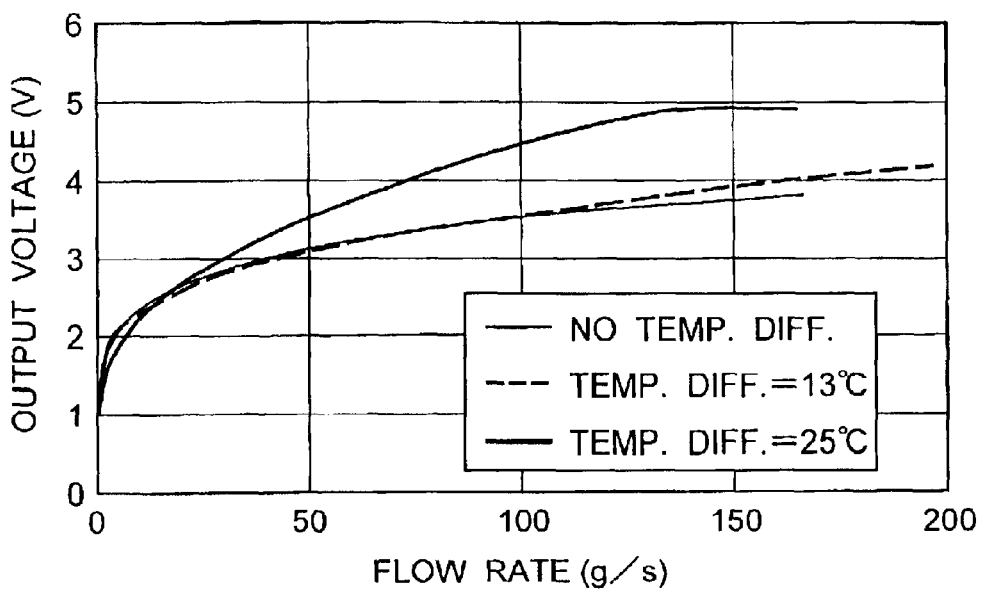
FIG. 8 is a graph showing one example of measurement by the fluid flow rate measuring apparatus of FIG. 1.

Two examples of measurement of the flow rate of the fluid by the fluid flow rate measuring apparatus of the first embodiment are described below. FIG. 8 is directed to one example of measurement of the flow rate of the fluid by the fluid flow rate measuring apparatus and shows relation between the flow rate at the time of a supply voltage of 5V and an output voltage Vout in FIG. 3. This graph deals with cases in which a temperature difference of the first and second temperature detecting elements 7 and 8 is 0° C., 13° C. and 25° C. It is understood from the graph that sensitivity at the time the temperature difference is 13° C. and 25° C. is higher than that at the time there is no temperature difference between the first and second temperature detecting elements 7 and 8. It is also understood from the graph that the output voltage Vout is saturated at 150 g/s at the time the temperature difference is 25° C. Degree of rise of this sensitivity depends on the temperature difference between the first and second temperature detecting elements 7 and 8.

Figure 9:
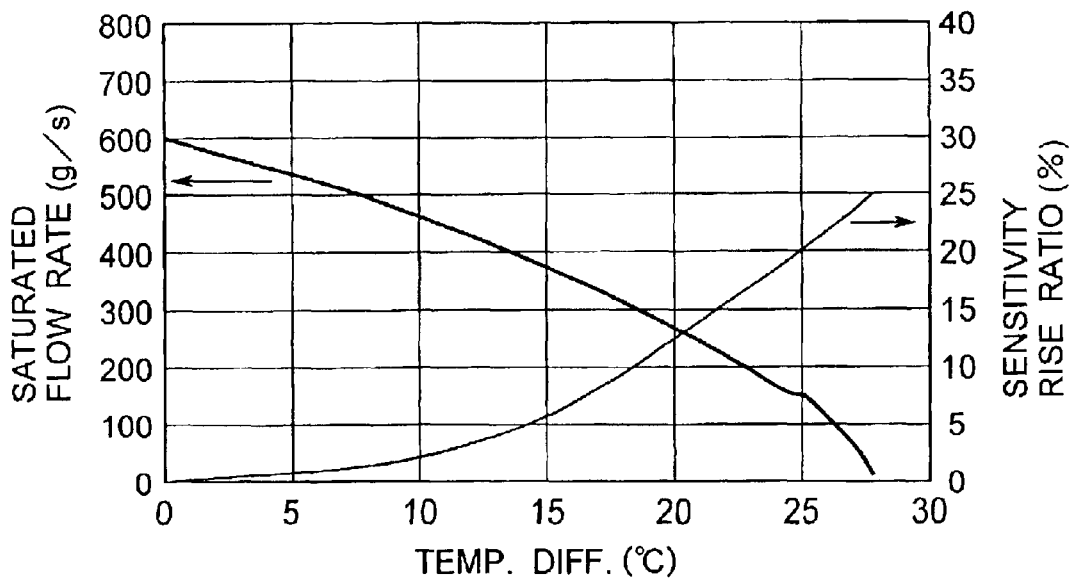
FIG. 9 is a graph showing another example of measurement by the fluid flow rate measuring apparatus of FIG. 1.

Meanwhile, FIG. 9 shows relation among temperature difference, flow rate when the output voltage is saturated and sensitivity rise ratio at the time of a supply voltage of 5V and a flow rate of 10 g/s. From the relation among temperature difference, flow rate when the output voltage is saturated and sensitivity rise ratio in FIG. 9, a suitable range of temperature difference can be set.

In the case of a fluid flow rate measuring apparatus for use in a motor vehicle, not more than 1% is demanded for a reproducibility of measurement values. Namely, if the sensitivity rise ratio is less than 1%, advantages of the present invention cannot be effective. Therefore, the sensitivity rise ratio should be selected more than 1% (first condition). Meanwhile, since the sensitivity becomes lower according as the flow rate becomes smaller, a measurable lower limit of the flow rate is 0.5 g/s. Furthermore, a dynamic range of the measurement values should be at least 200 times. Since the measurable lower limit of the flow rate is 0.5 g/s, at least 100 g/s should be measurable at a large flow rate (second condition). Based on these two conditions, an effective temperature difference between the first and second temperature detecting elements 7 and 8 ranges from 5° C. to 26° C. in the case of the fluid flow rate measuring apparatus for use in the motor vehicle.

(Second Embodiment)

Figure 10:
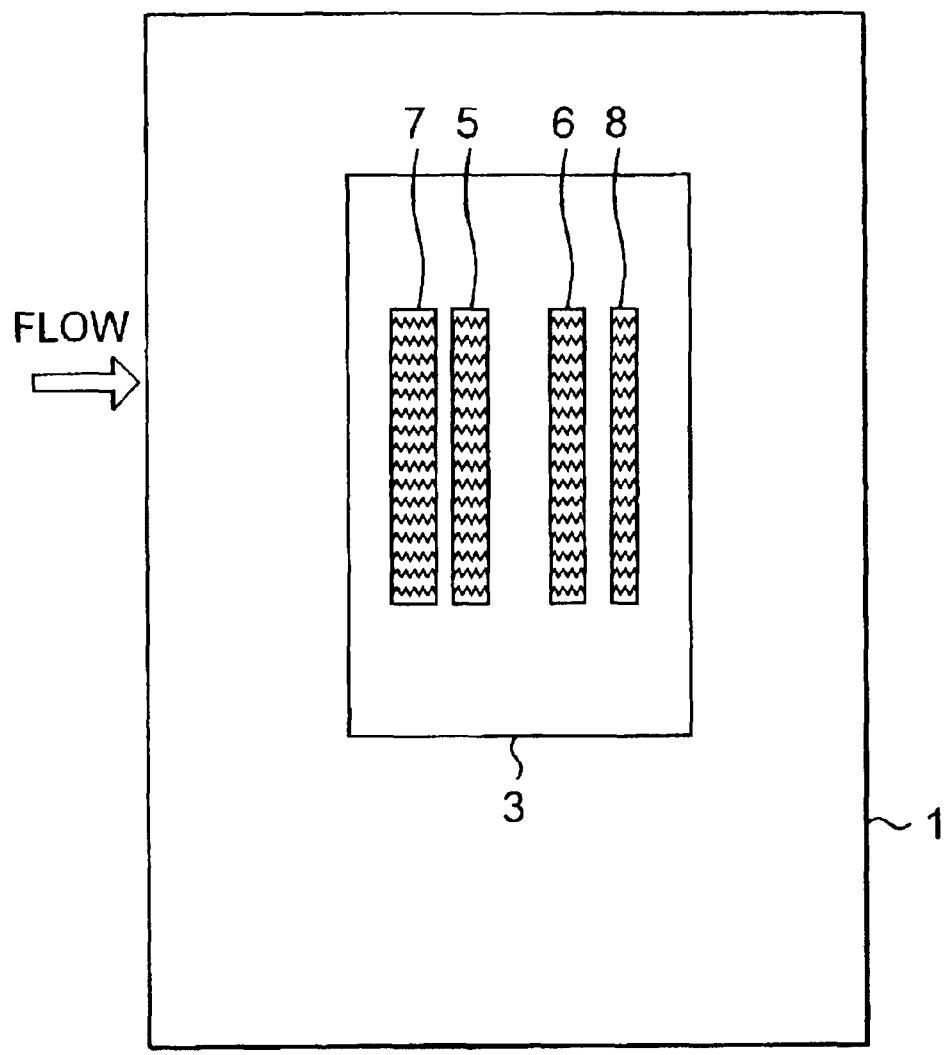
FIG. 10 is a top plan view of a fluid flow rate measuring apparatus according to a second embodiment of the present invention.

FIG. 10 shows a fluid flow rate measuring apparatus according to a second embodiment of the present invention. In this fluid flow rate measuring apparatus, a resistance value of the first temperature detecting element 7 is made smaller than that of the second temperature detecting element 8 at a specific temperature of, for example, 0° C. Meanwhile, the fixed resistances 9 and 10 have the identical resistance value in the same manner as the first embodiment. For example, by making a pattern width of the first temperature detecting element 7 larger than that of the second temperature detecting element 8, the resistance value of the first temperature detecting element 7 can be made smaller than that of the second temperature detecting element 8. It is needless to say that the resistance value of the first temperature detecting element 7 can be made smaller than that of the second temperature detecting element 8 by changing a length or a thickness of the first temperature detecting element 7 relative to that of the second temperature detecting element 8.

The resistance value R7 of the first temperature detecting element 7 and the resistance value R8 of the second temperature detecting element 8 can be expressed as functions of temperature as follows:

$$R7 = R70(1 + \alpha T7) \tag{5}$$

$$R8 = R80(1 + \alpha T8) \tag{6}$$

where R70 and R80 are resistance values of the first and second temperature detecting elements 7 and 8 at a temperature of 0° C., respectively, α is a temperature coefficient of resistance of the first and second temperature detecting elements 7 and 8 and T7 and T8 are temperatures of the first and second temperature detecting elements 7 and 8, respectively.

As described above, the resistance values R70 and R80 of the first and second temperature detecting elements 7 and 8 at the specific temperature of 0° C. are set as follows.

$$R70 < R80 \tag{7}$$

Figure 11:
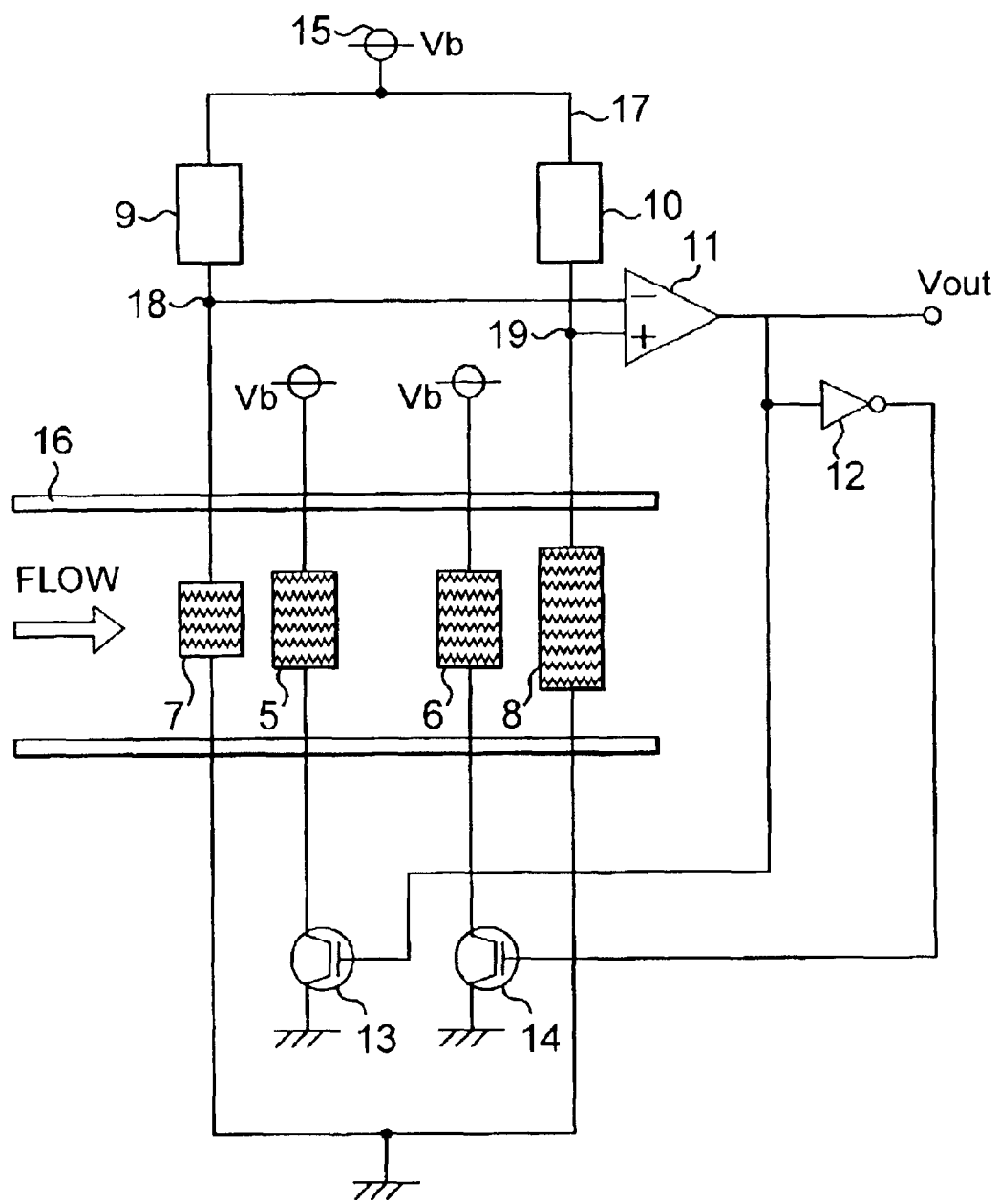
FIG. 11 is a circuit diagram of the fluid flow rate measuring apparatus of FIG. 10.

If this fluid flow rate measuring apparatus is operated in combination with a circuit of FIG. 11, control identical with that of the first embodiment is performed such that the intermediate potentials 18 and 19 are held identical with each other. At this time, in case the resistance values of the fixed resistances 9 and 10 are selected so as to be identical with other, the resistance values R7 and R8 of the first and second temperature detecting elements 7 and 8 become identical with each other as follows.

$$R7 = R8 \tag{8}$$

Hence, from the above equations (5) and (6), the following equation (9) is obtained.

$$T7 = (R80/R70)T8 + (R80/R70 - 1)/\alpha \tag{9}$$

From the above equation (7), the following relation is obtained.

$$R80/R70 > 1 \tag{10}$$

Thus, from the above equations (9) and (10), the following relation is obtained.

$$T7 > T8 \tag{11}$$

It is seen from the above equation (11) that the temperature T7 of the first temperature detecting element 7 is held higher than the temperature T8 of the second temperature detecting element 8. As a result, in the same manner as the first embodiment, amount of temperature change of the second temperature detecting element 8 can be held large, so that such an effect as improvement of sensitivity of the fluid flow rate measuring apparatus can be gained.

Meanwhile, in the second embodiment, by making the resistance values of the first and second temperature detecting elements 7 and 8 different from each other at the time of manufacture of the fluid flow rate measuring apparatus, an additional fixed resistance is not required to be provided in the circuit, so that the fluid flow rate measuring apparatus can be easily manufactured at low cost.

(Third Embodiment)

Figure 12:
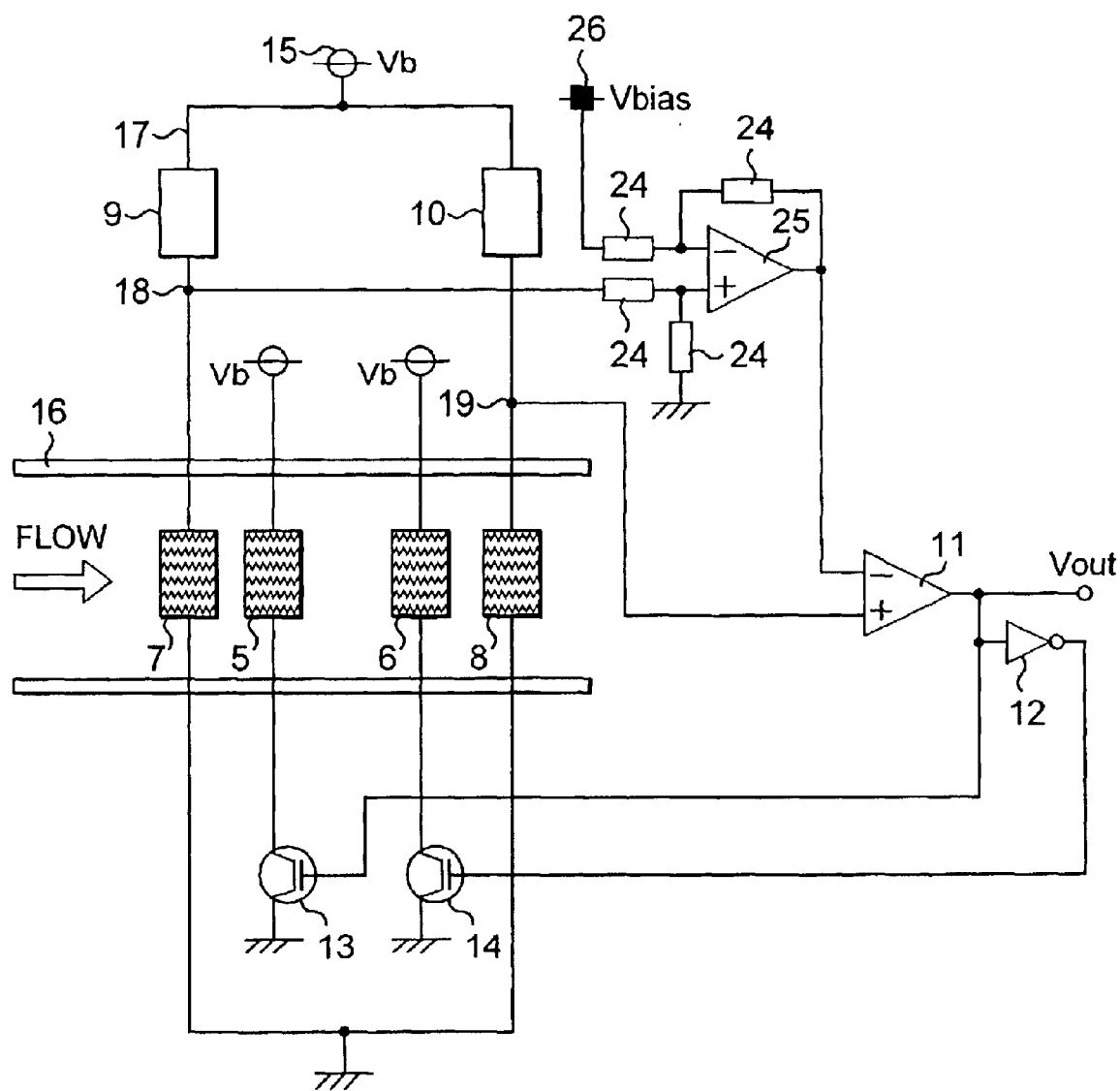
FIG. 12 is a circuit diagram of a fluid flow rate measuring apparatus according to a third embodiment of the present invention.
Figure 13:
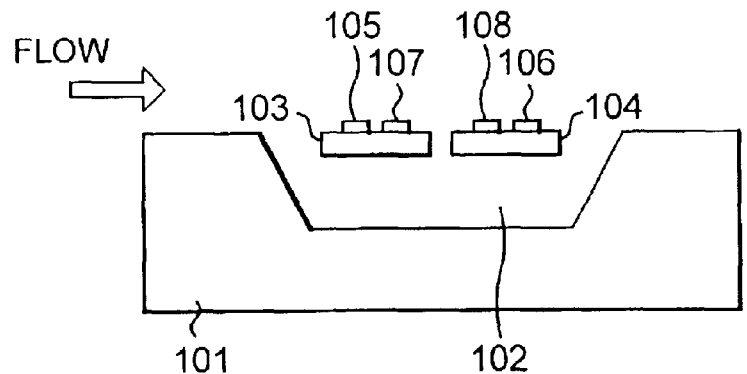
FIG. 13 is a sectional view of a prior art fluid flow rate measuring apparatus.
Figure 14:
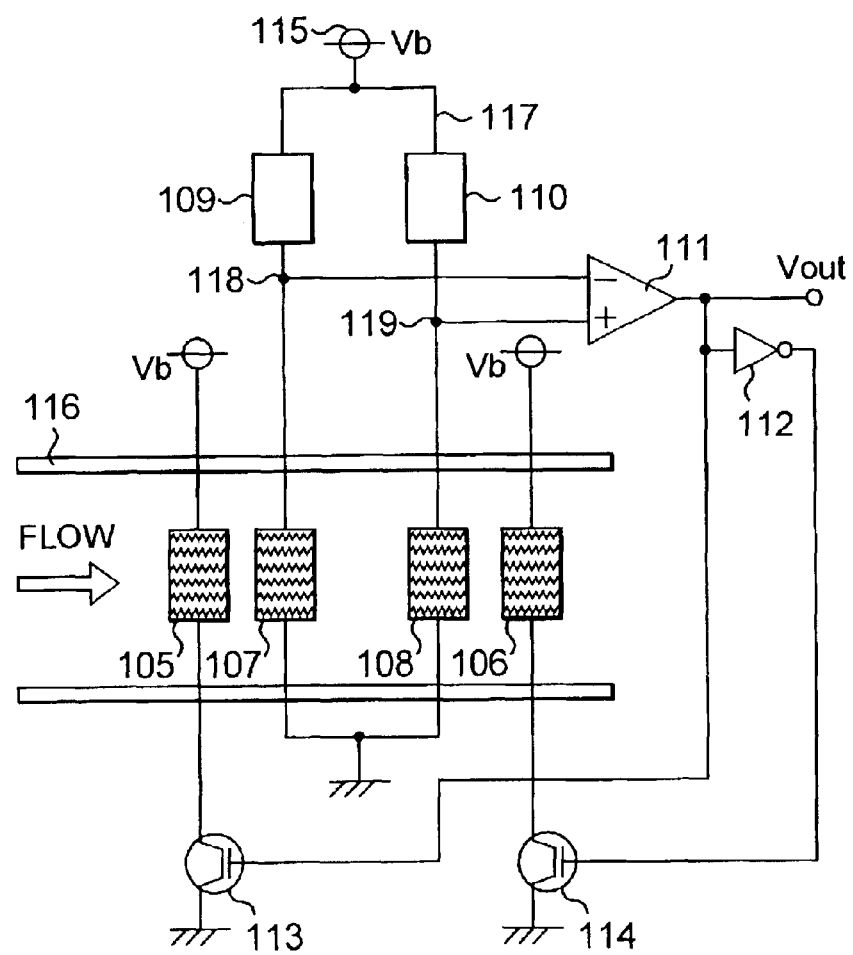
FIG. 14 is a circuit diagram of the prior art fluid flow rate measuring apparatus of FIG. 13.

FIG. 12 is a circuit diagram of a fluid flow rate measuring apparatus according to a third embodiment of the present invention. In the circuit, a differential amplifier 25 is connected to the intermediate potential 18 and a bias voltage 26 is subtracted from the intermediate potential 18. Four fixed resistances 24 are set to an identical value and the differential amplifier 25 has a gain of 1. Thus, a voltage applied to one input terminal of the comparator 11 is a value obtained by subtracting the bias voltage 26 (Vbias) from the intermediate potential 18 (V18), while the intermediate potential 19 (V19) is applied to the other input terminal of the comparator 11. Meanwhile, the fixed resistances 9 and 10 have the identical resistance value in the same manner as the first embodiment. Therefore, by operating the circuit of FIG. 12, control is performed such that the following relation is obtained.

$$V18 - Vbias = V19 \tag{12}$$

Namely, control is performed such that the intermediate potential 18 is larger than the intermediate potential 19. In order to make the intermediate potential 18 larger than the intermediate potential 19, the resistance value of the first temperature detecting element 7 should be made larger than that of the second temperature detecting element 8. Therefore, the temperature of the first temperature detecting element 7 is held higher than that of the second temperature detecting element 8. As a result, in the same manner as the first embodiment, amount of temperature change of the second temperature detecting element 8 can be held large, so that such an effect as improvement of sensitivity of the fluid flow rate measuring apparatus can be achieved.

In FIG. 12, the bias voltage 26 is subtracted from the intermediate voltage 18, the same effect can be, needless to say, obtained also in a configuration in which a bias voltage is added to the intermediate potential 19.

As is clear from the foregoing description, since the fluid flow rate measuring apparatus of the present invention includes the first heating element which is disposed at the upstream side in the direction of flow of the fluid, the first temperature detecting element which is formed in the vicinity of the first heating element, the second heating element which is disposed at the downstream side in the direction of flow of the fluid, the second temperature detecting element which is formed in the vicinity of the second heating element and the power source which is connected to the first and second heating elements and supplies electric power to the first and second heating elements so as to make the temperature of the first temperature detecting element higher by the predetermined value than that of the second temperature detecting element at all times such that the flow rate of the fluid is measured from a ratio of a quantity of the electric power supplied to the first heating element to that supplied to the second heating element, such a marked effect is gained that sensitivity of the flow rate is improved over a whole measurable flow rate region.

What is claimed is:

1. A fluid flow rate measuring apparatus for measuring a flow rate of fluid, comprising:
    a first heating element disposed in a flow of a fluid;
    a first temperature detecting element proximate the first heating element;
    a second heating element disposed in the flow of the fluid and located downstream, in direction of the flow of the fluid, relative to the first heating element;
    a second temperature detecting element proximate the second heating element; and
    a power source connected to the first and second heating elements and supplying electrical power to the first and second heating elements to make temperature of the first temperature detecting element higher by a fixed temperature difference than temperature of the second temperature detecting element at all times whereby the flow rate of the fluid is measured from relative quantities of the electrical power supplied to the first heating element and the second heating element.

2. The fluid flow rate measuring apparatus according to claim 1, including two fixed resistances connected in a bridge circuit with the first and second temperature detecting elements, resistances of the two fixed resistances being selected such that the temperature of the first temperature detecting element is higher by the fixed temperature difference than the temperature of the second temperature detecting element.

3. The fluid flow rate measuring apparatus according to claim 1, including two fixed resistances connected in a bridge circuit with the first and second temperature detecting elements and, resistances of the first and second temperature detecting elements are selected so that the temperature of the first temperature detecting element is higher by the fixed temperature difference than the temperature of the second temperature detecting element.

4. A fluid flow rate measuring apparatus for measuring a flow rate of fluid, comprising:
    a first heating element disposed in a flow of a fluid;
    a first temperature detecting element proximate the first heating element;
    a second heating element disposed in the flow of the fluid and located a downstream, in direction of the flow of the fluid, relative to the first heating element;
    a second temperature detecting element proximate the second heating element;
    a first fixed resistance connected in series with the first temperature detecting element;
    a second fixed resistance connected in series with the second temperature detecting element and having a resistance equal to that of the first fixed resistance, the first and second temperature detecting elements and the first and second fixed resistances being connected in a bridge circuit;
    a comparator;
    a first switching circuit coupled between an output terminal of the comparator and the first heating element; and
    a second switching circuit coupled between the output terminal of the comparator and the second heating element, wherein at a fixed temperature, resistance of the first temperature detecting element is smaller than resistance of the second temperature detecting element.

5. A fluid flow rate measuring apparatus for measuring a flow rate of fluid, comprising:
    a first heating element disposed in a flow of a fluid;
    a first temperature detecting element proximate the first heating element;
    a second heating element disposed in the flow of the fluid and located downstream, in direction of the flow of the fluid, relative to the first heating element;
    a second temperature detecting element proximate the second heating element and having a resistance equal to that of the first temperature detecting element;
    a first fixed resistance is connected in series with the first temperature detecting element;
    a second fixed resistance is connected in series with the second temperature detecting element;
    the first and second temperature detecting elements and the first and second fixed resistances being connected in a bridge circuit;
    a comparator;
    a first switching circuit coupled between an output terminal of the comparator and the first heating element; and
    a second switching circuit coupled between the output terminal of the comparator and the second heating element, wherein resistance of the first fixed resistance is larger than resistance of the second fixed resistance.

* * * * *